Dec. 15, 1925.                              1,566,080
W. A. DILLARD
WHEEL
Filed June 26, 1925

Wesley A. Dillard,
INVENTOR

BY Victor J. Evans,
ATTORNEY

WITNESS:

Patented Dec. 15, 1925.

1,566,080

UNITED STATES PATENT OFFICE.

WESLEY A. DILLARD, OF PINE BLUFF, ARKANSAS.

WHEEL.

Application filed June 26, 1925. Serial No. 39,817.

*To all whom it may concern:*

Be it known that I, WESLEY A. DILLARD, a citizen of the United States, residing at Pine Bluff, in the county of Jefferson and State of Arkansas, have invented new and useful Improvements in Wheels, of which the following is a specification.

This invention relates to improvements in vehicle wheels and has for an object the provision of a duplex tired wheel whose tires are of different diameters, so that in the event of damage to one tire, the other tire will be brought into use and use of the wheel continued without further injury to the damaged tire.

Another object of the invention is the provision of a wheel of this type which includes a felly of novel construction upon which the tires are so positioned and secured as to permit of the independent removal of one tire without disturbing the other tire.

With the above and other objects in view, the invention further includes the following novel features and details of construction, to be hereinafter more fully described, illustrated in the accompanying drawings and pointed out in the appended claims.

In the drawings:—

Figure 1:
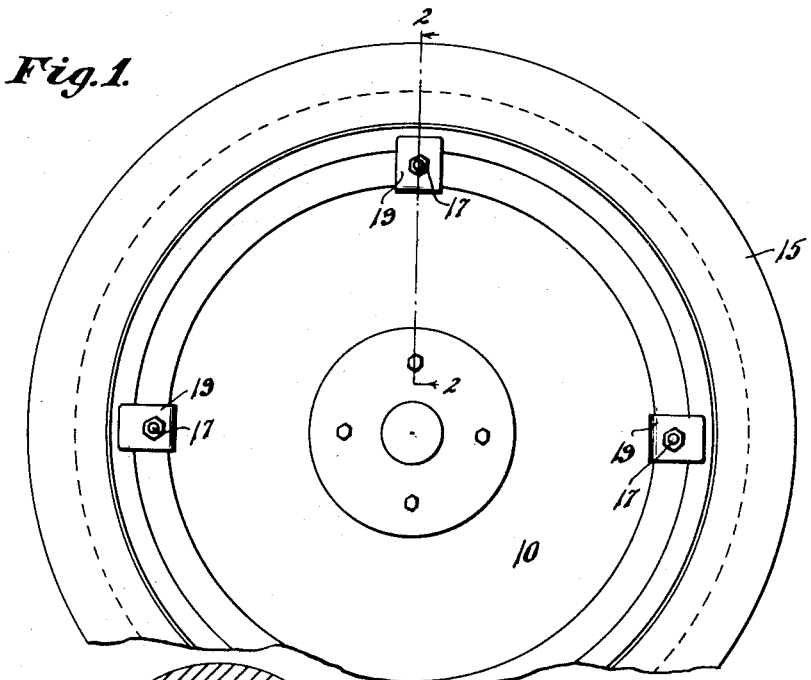
Figure 1 is a fragmentary elevation showing a wheel constructed in accordance with the invention.
Figure 2:
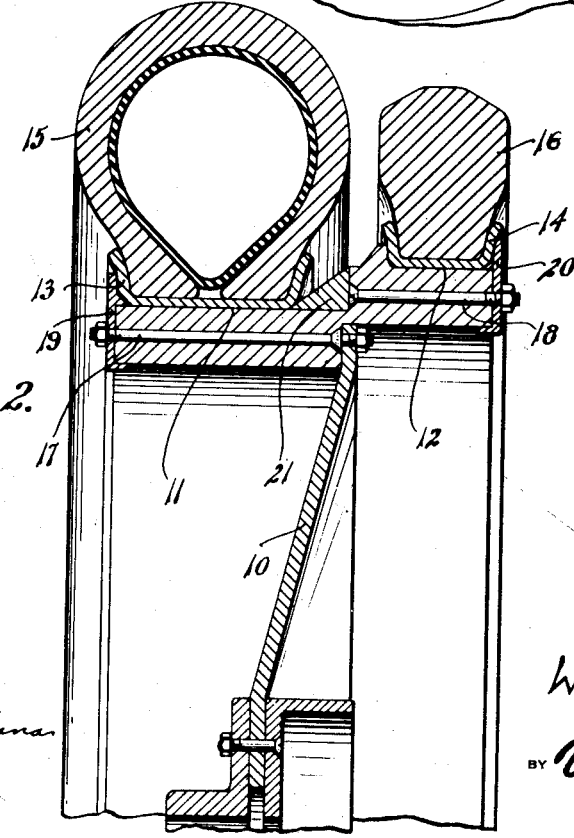
Figure 2 is an enlarged fragmentary sectional view taken substantially on the line 2—2 of Figure 1.
Figure 3:
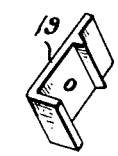
Figure 3 is a detail view of one of the retaining lugs.

Referring to the drawings in detail wherein like characters of reference denote corresponding parts, the wheel which may be of any desired type, such as an artillery wheel, wire wheel or disc wheel, is shown as of the last mentioned type and is indicated at 10. The wheel includes a felly which is provided with circumferentially arranged tire grooves 11 and 12, the last mentioned groove being of a lesser width than the groove 11. Removably positioned within the grooves 11 and 12 are rims 13 and 14 respectively which are adapted to hold tires 15 and 16 respectively, the former being of a greater diameter than the latter so as to normally support the wheel, while the tire 16 is designed to support the wheel in event of injury to the tire 15. One or both of the tires may be of the pneumatic type, but it is preferred to make the larger tire 15 a pneumatic tire while the tire 16 is preferably solid and is designed as a reserve tire. Should the tire 15 become damaged, the wheel will be supported upon the tire 16 without further injury to the damaged tire.

One of the novel features of the invention resides in the means of securing the rim in position and for this purpose, there is provided bolts or studs 17 and 18, the former together with lugs 19 providing retaining means for the rim 13, while the bolts or studs 18 together with lugs 20 provide retaining means for the rim 14. The inner wall of the channel 11 is formed by a transversely wedge shaped annular member 21 which bears against the inner ends of the bolts or lugs 18 and in addition provides an inclined inner wall for the channel 11 also provides retaining means for the lugs or bolts 18. The lugs or bolts 17 are held in place by the disc of the wheel 10.

The invention is susceptible of various changes in its form, proportions and minor details of construction and the right is herein reserved to make such changes as properly fall within the scope of the appended claim.

Having described the invention what is claimed is:

In a wheel, a felly having spaced tire receiving channels therein, said channels being of different widths, an automobile rim for each channel, means including circumferentially spaced bolts for removably securing the rims in place, a transversey wedge shaped annular member located within one of the channels and bearing against the inner ends of the spaced bolts of the other channel and providing an inclined side wall for the first mentioned channel and a tire mounted upon each rim.

I testimony whereof I affix my signature.

WESLEY A. DILLARD.